(12) United States Patent
Nakamura et al.

(10) Patent No.: US 10,894,468 B2
(45) Date of Patent: Jan. 19, 2021

(54) ELECTRIC DRIVE VEHICLE

(71) Applicant: Hitachi Construction Machinery Co., Ltd., Tokyo (JP)

(72) Inventors: Shingo Nakamura, Ibaraki (JP); Kenji Sato, Ibaraki (JP); Hitomi Ooshima, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 9 days.

(21) Appl. No.: 16/490,993

(22) PCT Filed: Jul. 26, 2018

(86) PCT No.: PCT/JP2018/028157
§ 371 (c)(1),
(2) Date: Sep. 4, 2019

(87) PCT Pub. No.: WO2019/058757
PCT Pub. Date: Mar. 28, 2019

(65) Prior Publication Data
US 2020/0009955 A1    Jan. 9, 2020

(30) Foreign Application Priority Data

Sep. 19, 2017 (JP) ................. 2017-178684

(51) Int. Cl.
*B60K 1/00* (2006.01)
*B60K 6/22* (2007.10)
(Continued)

(52) U.S. Cl.
CPC ................. *B60K 1/00* (2013.01); *B60K 6/22* (2013.01); *B60K 6/46* (2013.01); *B60L 5/24* (2013.01);
(Continued)

(58) Field of Classification Search
CPC ......... B60K 1/00; B60K 6/22; Y02T 10/7072; B60L 5/24; B60L 9/18; B60L 50/13
See application file for complete search history.

(56) References Cited

U.S. PATENT DOCUMENTS 5,954,171 A * 9/1999 Gramatke ................. B60L 5/28
  191/59.1
8,232,671 B2 * 7/2012 Andre ...................... B60L 5/42
  307/9.1

(Continued)

FOREIGN PATENT DOCUMENTS

| JP | 2015-12744 A | 1/2015 |
| WO | WO 2013/124994 A1 | 8/2013 |
| WO | WO 2015/075773 A1 | 5/2015 |

OTHER PUBLICATIONS

International Search Report (PCT/ISA/210) issued in PCT Application No. PCT/JP2018/028157 dated Oct. 23, 2018 with English translation (three (3) pages).

(Continued)

*Primary Examiner* — John D Walters
*Assistant Examiner* — James J Triggs
(74) *Attorney, Agent, or Firm* — Crowell & Moring LLP

(57) ABSTRACT

An electric drive vehicle provided with a current collecting device, the current collecting device including: a framework having an underframe, a lower frame that is pivotably linked to the underframe, and an upper frame that is pivotably linked to the lower frame; a current collecting portion that is supported by the upper frame; and a lock mechanism that holds the framework in a predetermined posture, in which the framework is capable of moving up and down between a standing posture in which the current collecting portion is ascended and a folded posture in which the current collecting portion is descended, and the lock mechanism includes an adsorption plate made of a magnetic material provided in (Continued)

the upper frame, and a hook device which is equipped with an electromagnet and adsorbs to hold the adsorption plate by a magnetic force to hold the framework in the folded posture.

7 Claims, 7 Drawing Sheets

(51) Int. Cl.
 *B60L 50/13* (2019.01)
 *B60K 6/46* (2007.10)
 *B60L 5/24* (2006.01)
 *B60L 5/26* (2006.01)
 *B60L 9/18* (2006.01)

(52) U.S. Cl.
 CPC . *B60L 5/26* (2013.01); *B60L 9/18* (2013.01); *B60L 50/13* (2019.02)

(56) References Cited

U.S. PATENT DOCUMENTS

| | | | | |
|---|---|---|---|---|
| 9,352,658 B2* | 5/2016 | Morris | ............ | B60L 5/42 |
| 9,381,818 B2* | 7/2016 | Gerstenberg | ......... | B60L 15/209 |
| 9,796,267 B1* | 10/2017 | Ruth | ............ | B60W 40/13 |
| 9,988,835 B2* | 6/2018 | Storm | ............ | B60L 9/00 |
| 10,793,006 B2* | 10/2020 | Kerscher | ............ | B60L 53/32 |
| 2015/0034441 A1* | 2/2015 | Nakajima | ............ | B60L 3/0023 |
| | | | | 191/59.1 |
| 2020/0009955 A1* | 1/2020 | Nakamura | ............ | B60K 6/22 |

OTHER PUBLICATIONS

Japanese-language Written Opinion (PCT/ISA/237) issued in PCT Application No. PCT/JP2018/028157 dated Oct. 23, 2018 (three (3) pages).

* cited by examiner

ELECTRIC DRIVE VEHICLE

TECHNICAL FIELD

The present invention relates to an electric drive vehicle that is used, for example, for ore transportation at a mining site such as a large scale mine, and travels by receiving an electric power from an overhead wire of a feeding facility through a current collecting device.

BACKGROUND ART

Conventionally, when an electric drive vehicle is allowed to travel efficiently by an electric drive at a mining site where an overhead wire is installed from a feeding facility, there is a need to drive the electric drive vehicle so that a current collecting portion (also called a collector shoe or a slider) of a current collecting device provided so as to be able to move up and down does not come off the overhead line. The overhead wire is also called "trolley wire" and the current collecting device is also called "pantograph".

A trolley type dump truck which is an example of an electric drive vehicle used in a mine or the like can travel with the use of two traveling modes including a trolley mode which travels with an electric power obtained from the overhead wire and a diesel mode (non-trolley mode) which travels with a diesel engine as a prime mover without obtaining an electric power from the overhead wire. The pantograph has a mechanism capable of controlling an ascent and a descent of the current collecting portion by the aid of a controller installed in a cab. When the trolley type dump truck travels in the trolley mode, the current collecting portion of the pantograph is raised to bring the overhead wire into contact with the current collecting portion to receive the electric power from the overhead wire. In addition, in a place where the overhead wire is not laid, the trolley type dump truck folds the pantograph, switches the traveling mode to the diesel mode, and generates the electric power by a generator driven by the diesel engine to travel.

By the way, in general, a load surface of a place in which the overhead wire is not laid such as a loading site or a dumping site is not well maintained in a flat state as compared with a road surface in which the overhead wire is laid. For that reason, during traveling at a place where the overhead wire is not laid, the folded pantograph is subjected to a commeasurable vibration due to vibration. In other words, when traveling with the pantograph folded, the trolley type dump truck receives a large vibration due to the unevenness of the road surface or the like, and the pantograph mounted on the trolley type dump truck also vibrates greatly.

For example, Patent Literature 1 discloses a well-known technique related to the vibration countermeasure received at the time of folding the pantograph described above. Patent Literature 1 discloses that "there are provided a framework having a lower frame which is pivotably linked to an underframe and an upper frame which is pivotably linked to the lower frame and supports the collector shoe, and a lock mechanism that holds the framework in a folded posture. The lock mechanism includes a pivotable hook member having a hook portion engaged with a hook receiver provided on the collector shoe, a coil spring which urges the hook member toward one direction of pivoting directions in which the hook portion can be engaged with the hook receiver, and an actuator having a pressing rod portion that can be abutted against the hook member (refer to abstract).

CITATION LIST

Patent Literature

PATENT LITERATURE 1: Japanese Patent Application Laid-Open Publication No. 2015-12744

SUMMARY OF INVENTION

Technical Problem

Patent Literature 1 assumes a pantograph for railway vehicles, and since a traveling road surface is flat, there is no particular problem even if the look member of the lock mechanism is a pivotable movable portion. However, when the configuration of Patent Literature 1 is applied to the trolley type dump truck as it is, the lock mechanism may be damaged due to vibration if the road surface is large in unevenness when traveling in the diesel mode at the time of feeding no electric power. For that reason, in order to apply the technique of Patent Literature 1 to the trolley type dump truck, some improvement is required.

The present invention has been made in view of such a situation, and a technical problem of the present invention is to provide an electric drive vehicle capable of preventing a lock mechanism of a current collecting device from being damaged.

Solution to Problem

In order to solve the above technical problems, according to one aspect of the present invention, there is provided an electric drive vehicle provided with a current collecting device installed at an upper portion of a vehicle body and receiving an electric power from an overhead wire. The current collecting device includes: a framework having an underframe, a lower frame that is pivotably linked to the underframe, and an upper frame that is pivotably linked to the lower frame; a current collecting portion that is supported by the upper frame; and a lock mechanism that holds the framework in a predetermined posture. The framework is capable of moving up and down between a standing posture in which the current collecting portion is ascended and a folded posture in which the current collecting portion is descended, and the lock mechanism includes an adsorption plate made of a magnetic material provided in the upper frame, and a hook device which is equipped with an electromagnet by a magnetic force to hold the framework in the folded posture as the predetermined posture.

Advantageous Effects of Invention

According to the present invention, since there is no movable part in the lock mechanism, the lock mechanism of the current collecting device can be prevented from being damaged. Other problems, configurations, and effects are clarified by the following description of the embodiment.

DESCRIPTION OF EMBODIMENTS

Hereinafter, an electric drive vehicle according to the present invention will be described in detail with reference to the accompanying drawings.

Figure 1:
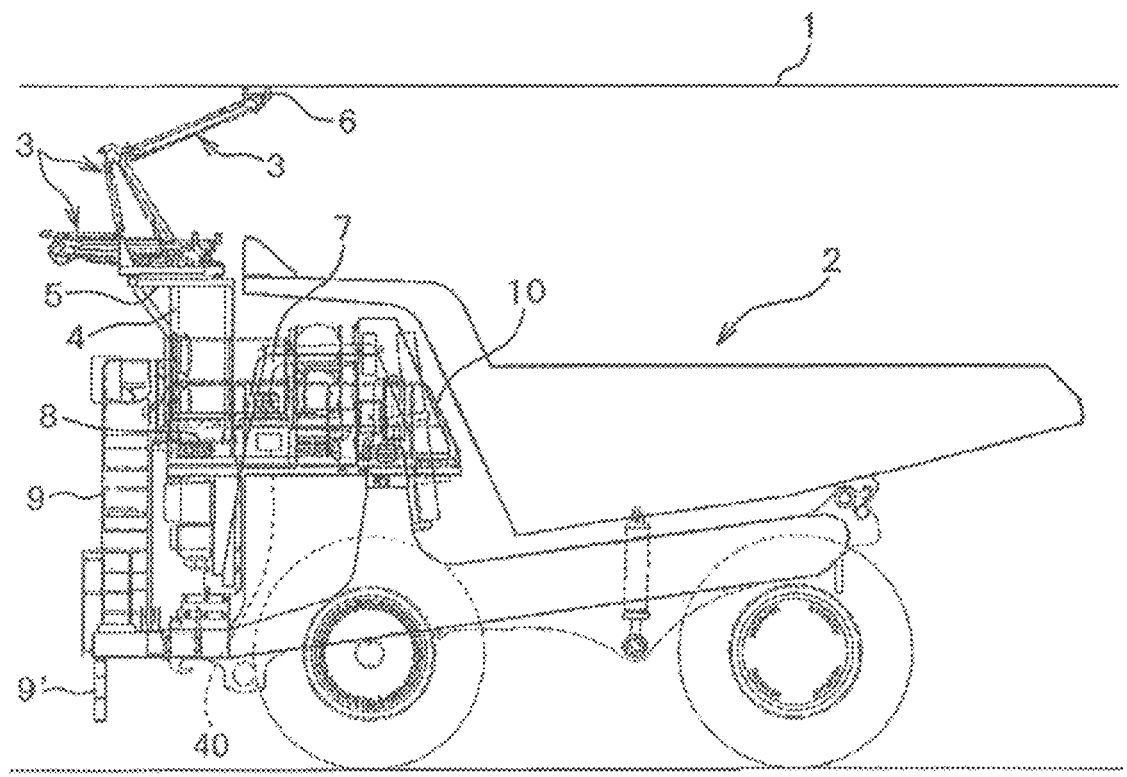
FIG. 1 is a side view of a trolley type dump truck according to an embodiment of the present invention.
Figure 2:
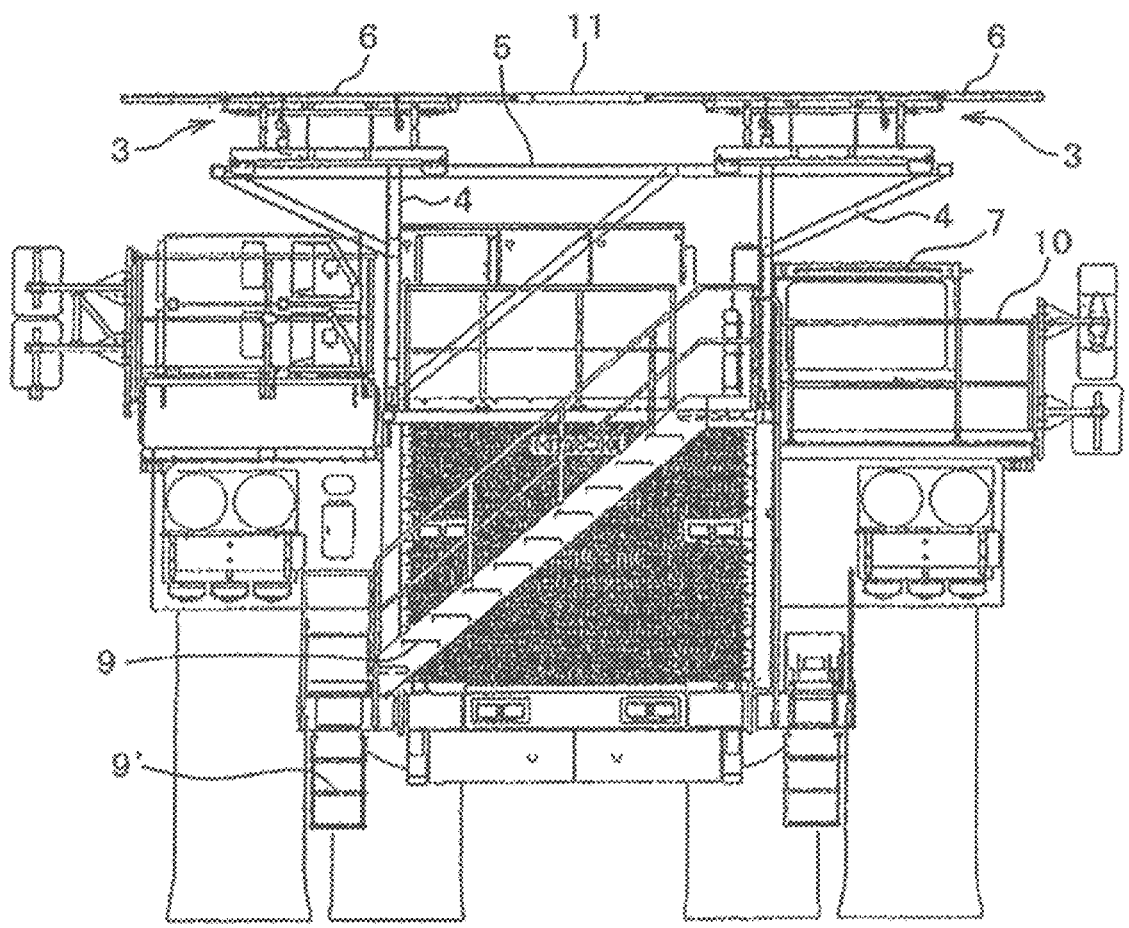
FIG. 2 is a front view of the trolley type dump truck of FIG. 1.

FIG. 1 is a side view of a trolley type dump truck of an electric drive vehicle according to an embodiment of the present invention, and FIG. 2 is a front view of the trolley type dump truck. FIG. 1 shows a use state in which a pantograph which is a current collecting device stands up, and FIG. 2 shows a storage state in which the pantograph is folded. In FIG. 1, an overhead wire 1 is extended from a feeding facility to a traveling road surface such as a large scale mine at a mining site, and a trolley type dump truck (hereinafter abbreviated as dump truck) 2 is used for ore transportation. The dump truck 2 is of an electric drive system that travels in combination with a trolley mode that travels with an electric power obtained from the overhead wire 1 and a diesel mode (non-trolley mode) that travels with an electric power obtained by driving a generator with a diesel engine ENG (refer to FIG. 8).

Switching between the trolley mode and the diesel mode is performed by a controller 40 provided in a cab 7. Although not shown, the controller 40 includes a CPU, a ROM, a RAM, a communication I/F, and the like, and controls the traveling of the dump truck 2 by the CPU reading and executing a program stored in the ROM. Further, in addition to controlling an ascending and descending operation of the pantograph 3, the controller 40 controls the operation of a lock mechanism 35 by switching the excitation and non-excitation of an electromagnet 24a-1 incorporated in a hook device 24 to be described later.

In the present embodiment, the trolley mode and the diesel mode are always used selectively for traveling. In particular, at the time of climbing a hill, a climbing speed can be improved by traveling in the trolley mode using the electric power obtained from the overhead wire 1. The trolley mode and the diesel mode can be changed by operating a mode switch 41 (refer to FIG. 8).

Further, an AC drive system is employed in which when the dump truck 2 travels by driving the generator with the diesel engine, after electricity obtained in the generator has been controlled by a control equipment such as an inverter, an AC motor (induction motor) as a load device is driven to travel. Incidentally, if an IGBT (Insulated Gate Bipolar Transistor) inverter and a grid resistor are adopted, a higher electric braking force can be exerted. The pantograph 3 whose ascending and descending operation is controlled according to the controller 40 installed in the cab 7 is mounted on a front upper portion of the dump truck 2.

Specifically, a mount 5 for mounting the pantograph is installed on an upper portion of a pantograph support 4 provided on a deck 8 of the dump truck 2, and the pantograph 3 for collecting a current from the overhead wire 1 is installed on the mount 5. A collector shoe 6 as a current collecting portion which contacts with and slides on the overhead wire 1 and collects an electric power from the overhead wire 1 is installed on an upper portion of the pantograph 3. Reference numerals 9 and 9' are steps for a driver or the like to get into the cab 7, and 10 is a handrail.

Furthermore, referring to a front view of FIG. 2, two pantographs 3 which are respectively installed on the right and left pantograph supports 4 are installed on the dump truck 2. The collector shoes 6 of the left and right pantographs 3 are connected to each other by a pantograph connecting plate 11 having an insulating property.

Figure 3:
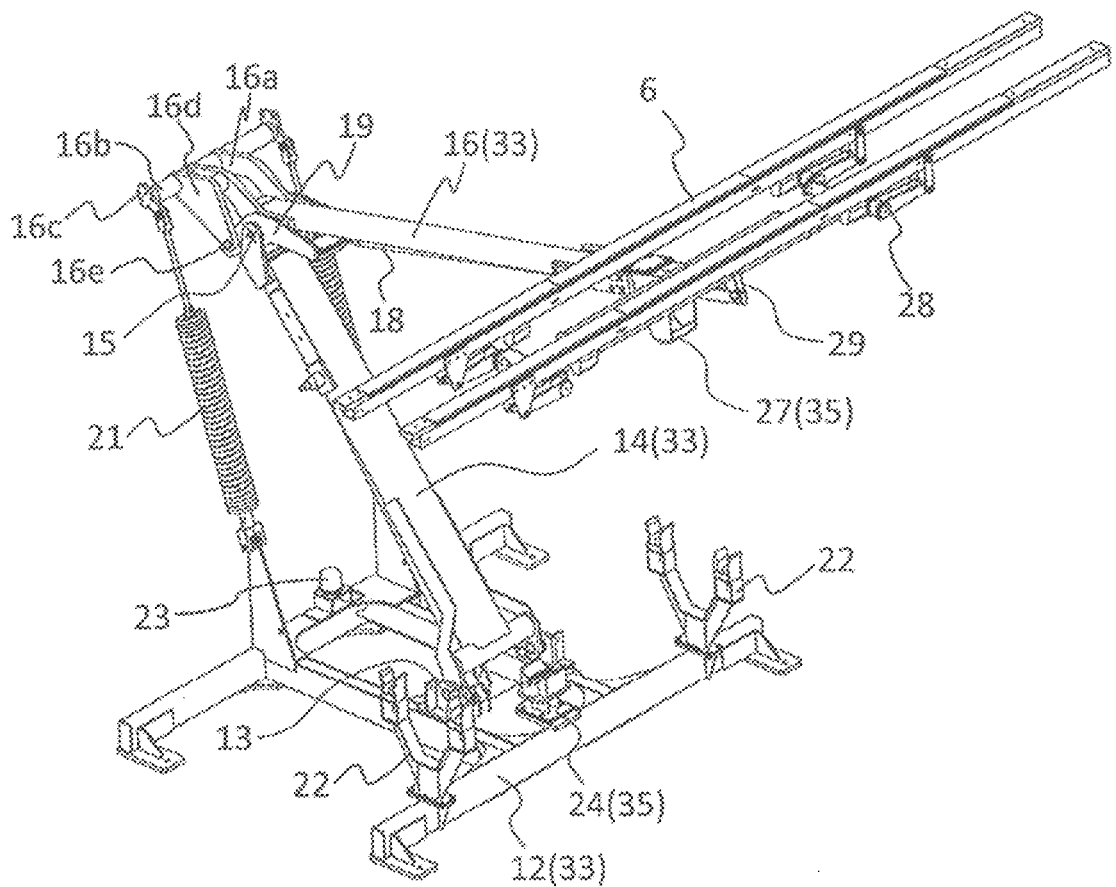
FIG. 3 is a perspective view showing a pantograph shown in FIG. 1 in a standing posture.
Figure 4:
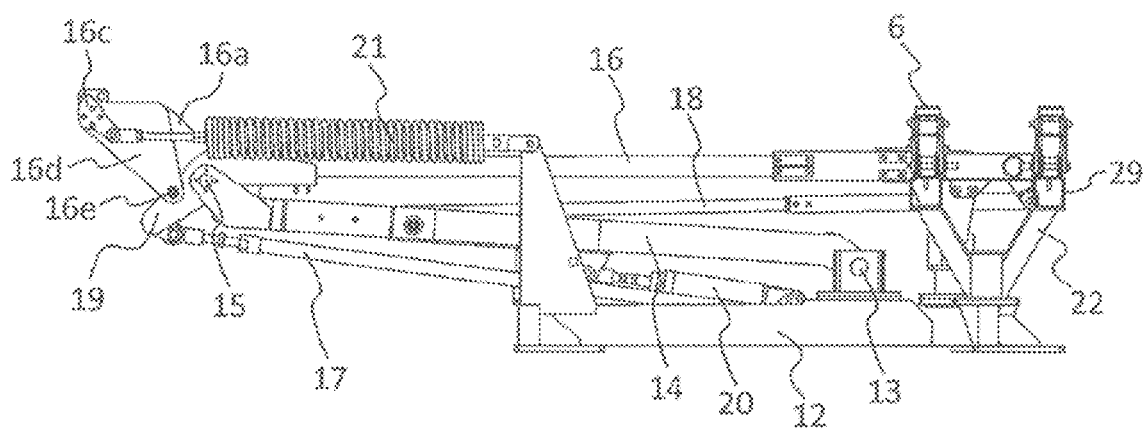
FIG. 4 is a side view showing the pantograph shown in FIG. 3 in a folded position.

FIG. 3 is an external perspective view of the pantograph 3 in a use state where the pantograph 3 stands up, and FIG. 4 is a side view showing a storage state in which the pantograph 3 is folded. The entire configuration of the pantograph 3 according to the present embodiment will be described with reference to FIGS. 3 and 4.

An underframe (base frame) 12 of the pantograph 3 is attached to the mount 5 on an upper portion of the pantograph support 4 described above. A base end of the lower frame (lower arm) 14 of the pantograph 3 is pivotably attached to an upper portion of the underframe 12 through a swing support shaft 13, and the lower frame 14 is configured to be able to rise and fall around the swing support shaft 13 which supports the base end. A connecting shaft 15 is provided parallel to the swing support shaft 13 at a leading end of the lower frame 14, and the base end of the upper frame (upper arm) 16 is pivotably linked to the connecting shaft 15. The collector shoe 6 is pivotably supported to a leading end of the upper end side of the upper frame 16 through a shoe support 28 and the like. The underframe 12, the lower frame 14 which is pivotably linked to the underframe 12, and the upper frame 16 that is pivotably linked to the lower frame 14 and supports the collector shoe 6 configure the framework 33.

In the pantograph 3, a lower balancing rod 17 is provided to form a parallel link mechanism with the lower frame 14, and an upper balancing rod 18 is provided to form a parallel link mechanism with the upper frame 16. The lower balancing rod 17 has a base end rotatably attached to the underframe 12. A parallel link receiver 19 is rotatably attached to the connecting shaft 15 provided at the leading end of the lower frame 14, and the leading end of the lower balancing rod 17 is rotatably connected to the parallel link receiver 19. In this example, the lower frame 14, the lower balancing rod 17, the underframe 12, and the parallel link receiver 19 configure a parallel link mechanism, and the parallel link receiver 19 is always kept in the same posture even when the lower frame 14 rises and falls.

A base end of the upper balancing rod 18 is rotatably connected to the parallel link receiver 19 and a leading end of the upper balancing rod 18 is rotatably connected to a bracket 29 provided on the shoe support 28 of the collector shoe 6. In this example, a parallel link mechanism is configured by the upper frame 16, the upper balancing rod 18, the parallel link receiver 19, and the collector shoe 6, and the collector shoe 6 is always held at a horizontal position in the same posture even if the lower frame 14 and the upper frame 16 rise and fall. As a result, even if the pantograph 3 ascends or descends, since the pantograph 3 is always held at a horizontal position in the same posture, the collector shoe 6 can bring an upper surface of the collector shoe 6 in uniform contact with the overhead wire 1.

Furthermore, in the pantograph 3, when the base end side is attached to the underframe 12 and a hydraulic cylinder (actuator) 20 whose leading end side is connected to the lower frame 14 is extended, the lower frame 14 stands up. When the hydraulic cylinder 20 is contracted, the lower frame 14 falls downward. One end side (lower side in FIG. 3) of a spring 21 for raising the upper frame 16 is coupled to the underframe 12. The other end side (upper side in FIG. 3) of the spring 21 is pivotably linked to an arm 16a provided so as to extend from the base end of the upper frame 16 to the opposite side of the collector shoe 6 across the connecting shaft 15, through a spring bearing rod 16b and a spring bearing bracket 16c.

With the configuration described above, when the hydraulic cylinder 20 is expanded and contracted, the pantograph 3 can be displaced between a standing posture (use state) in which the framework 33 stands up and the collector shoe 6 rises up to a position where the collector shoe 6 comes in contact with the overhead wire 1, and a folded posture (storage state) in which the framework 33 is folded and the collector shoe 6 descends. In addition, the collector shoe 6 can be pressed against the overhead wire 1 with a constant force through the lower frame 14 and the upper frame 16 by the spring force of the spring 21, and can move up and down by following a change in the height of an amplitude of the overhead wire 1. A leading end of the schematically illustrated damper device whose base end side is fixed to the underframe 12 is attached to a damper engagement portion 16e of a damper bracket 16d integrally attached to the arm 16a. The damper device suppresses the vibration of the upper frame 16.

In a state in which the pantograph 3 is folded, a shoe support 22 for supporting the collector shoe 6 can be provided at two positions in a longitudinal direction of the collector shoe 6 on the underframe 12 so as to be able to support both sides of the lower surface of the collector shoe 6. In addition, in order to support a lower surface of the lower frame 14, a cushioning material 23 made of an elastic material such as rubber is installed in the vicinity of a front center of the underframe 12. The cushioning material 23 abuts against the vicinity of an intermediate portion between the swing support shaft 13 and the connecting shaft 15 on the lower frame 14 to absorb or reduce the vibration acting on the lower frame 14. In other words, the cushioning material 23 is configured to cushion an impact caused by the contact with the local portion of the framework 33 at the time of folding the framework 33. The cushioning material 23 is installed between the underframe 12 and the lower frame 14 and plays a role of supporting the lower frame 14 and reducing the vibration of the framework 33 when the framework 33 is folded.

In addition, the pantograph 3 is provided with a lock mechanism 35 for holding the framework 33 in the folded posture. The lock mechanism 35 includes an adsorption plate 27 (to be described in detail later) made of a magnetic material provided at the leading end of the upper frame 16, and an electromagnetic lock type hook device 24 for suctioning and holding the adsorption plate 27 by a magnetic force to restrict the movement of the upper frame 16 in the vertical direction at the time of folding the framework 33, and holding the framework 33 in a folded posture (fixing the upper frame 16 to the underframe 12) (refer to FIG. 3).

Figure 5:
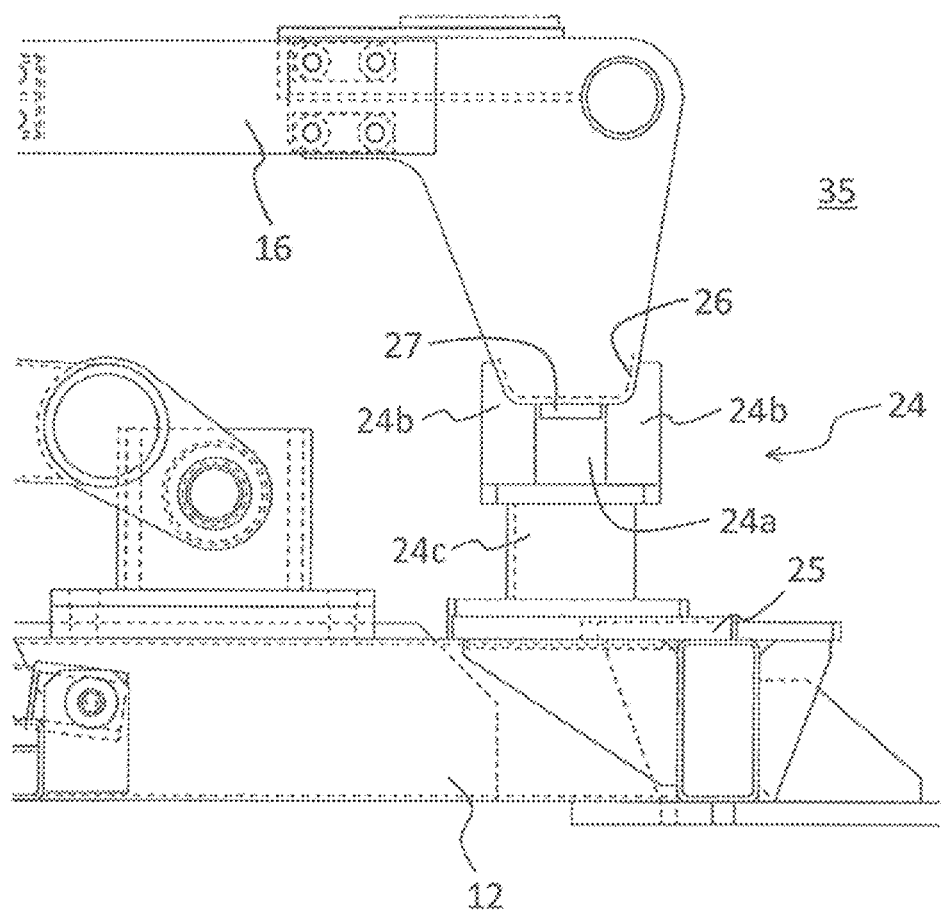
FIG. 5 is a partially enlarged side view showing a hook device shown in FIG. 3 in a locked state.
Figure 6A:
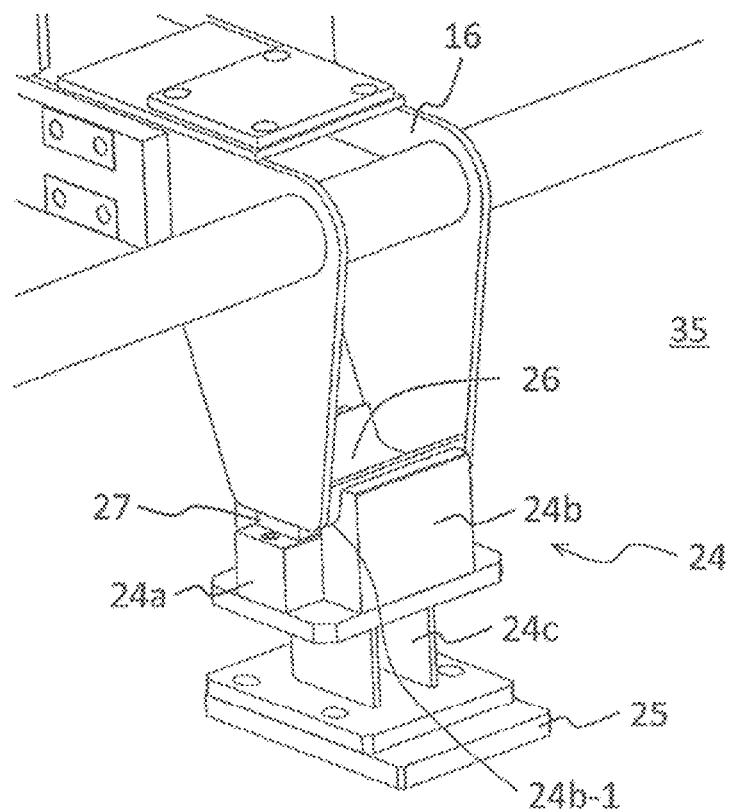
FIG. 6A is a partially enlarged perspective view showing the hook device shown in FIG. 5, which shows a locked state of the hook device.
Figure 6B:
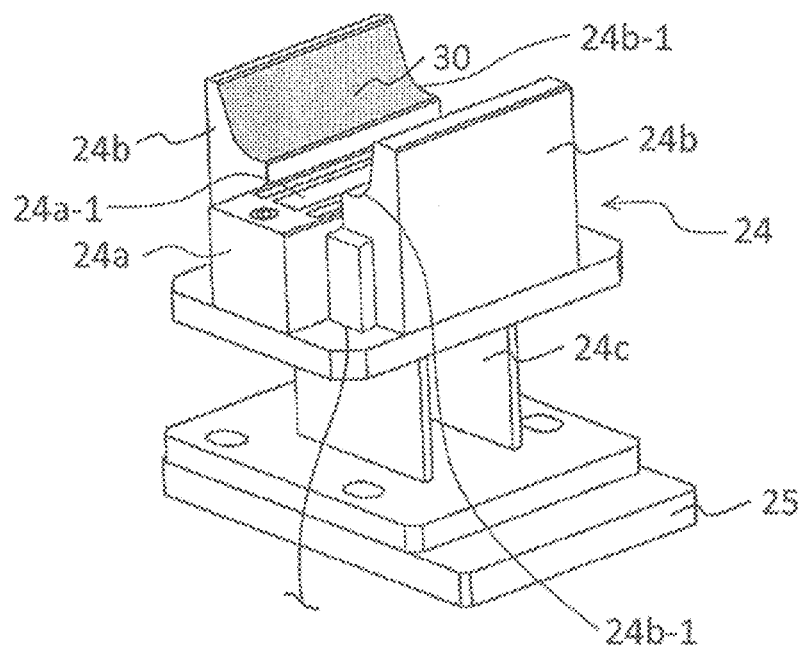
FIG. 6B is a partially enlarged perspective view showing the hook device shown in FIG. 5, which shows an unlocked state of the hook device.
Figure 7:
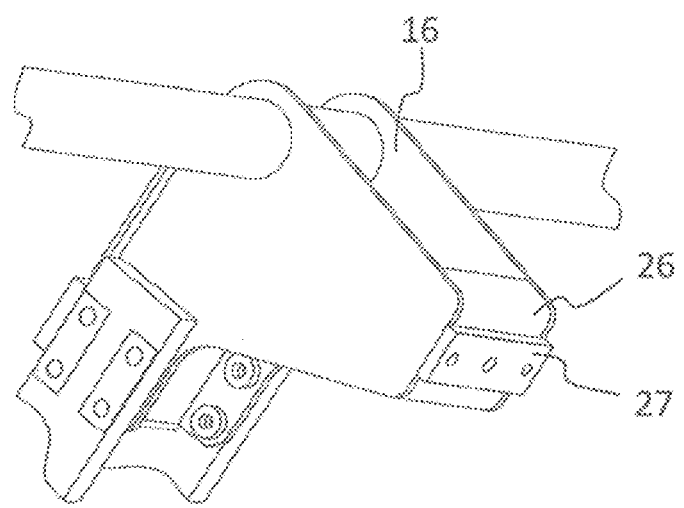
FIG. 7 is a perspective view showing a lower surface of a leading end of an upper frame of the pantograph shown in FIG. 3.

FIG. 5 is a partially enlarged side view showing the hook device 24 provided in the pantograph 3 in a locked state. FIGS. 6A and 6B are partially enlarged perspective views showing the hook device 24, in which FIG. 6A is a view showing a locked state of the hook device 24, and FIG. 6B is a view showing an unlocked state of the hook device 24. Incidentally, in FIG. 6B, illustrations of the upper frame 16 and so on are omitted. FIG. 7 is a perspective view showing the lower surface of the leading end of the upper frame 16 of the pantograph 3.

Referring to FIG. 7, an absorption plate (strike plate) 27 made of a magnetic material is attached to a fixing member 26 provided at the leading end of the upper frame 16. The fixing member 26 is made of, for example, a metal plate having a U-shaped cross section. As shown in FIGS. 6A and 6B, the hook device 24 is provided with a hook portion 24a with a built-in electromagnet 24a-1, and a hook receiver 24b in which the fixing member 26 is seated, and which firmly receives the fixing member 26 in the vertical direction. In the present specification, a term "firmly" means that the fixing member 26 does not rattle against violent vibration or shaking when the dump truck 2 travels in the diesel mode with the pantograph 3 folded. For that reason, although the hook receiver 24b is made of a resin material having the strength necessary to firmly receive the fixing member 26, the material is not limited. In addition, the hook device 24 includes a bracket 24c for attaching the hook portion 24a and the hook receiver 24b, and an installation base 25 for mounting the bracket 24c to the underframe 12.

The hook receiver 24b has a shape corresponding to the shape of the fixing member 26 having a substantially U-shaped cross section, and has a structure in which the fixing member 26 is just fitted into the hook receiver 24b when the framework 33 is folded. In other words, the hook receiver 24b has a structure in which the fixing member 26 and the hook receiver 24b are engaged with each other in a recession and projection fitting manner. Further, a rubber plate 30 as an elastic material is attached to an abutment surface 24b-1 of the hook receiver 24b with the fixing member 26. The rubber plate 30 has a displacement prevention, an impact prevention, and a breakage prevention against the hook receiver 24b of the fixing member 26.

In the pantograph 3 according to the present embodiment described above, the electromagnet 24a-1 incorporated in the hook device 24 is excited according to a pantograph descent command from the controller 40, and the electromagnet 24a-1 is not excited according to a pantograph ascent command. In other words, the electromagnet 24a-1 becomes excited or non-excited in conjunction with the ascending and descending operation of the pantograph 3. The ascent command and the descent command of the pantograph 3 is output, for example, by the operation of an operation button (not shown) in the cab 7.

When the pantograph descent command is output, the pantograph 3 is gradually folded, and the adsorption plate 27 attached to the leading end of the upper frame 16 of the pantograph 3 is magnetically attracted by the electromagnet 24a-1, and the upper frame 16 is firmly fixed to the underframe 12 by the hook device 24. As a result, the framework 33 is always held in the folded posture without rattling the upper frame 16 in the vertical direction even in the case of severe vibration or shaking.

Moreover, since the fixing member 26 and the hook receiver 24b are engaged with each other in the recession and projection fitting manner, the vibration of the framework 33 in the horizontal direction (the front-rear direction of the dump truck 2) can be also reduced. As described above, according to the present embodiment, even when the dump trunk 2 travels on an uneven rough road surface in the diesel mode, the pantograph 3 can be surely prevented from violently vibrating, or prevented from being damaged or deformed by large vibration. Moreover, the electromagnet 24a-1 is adopted for the lock mechanism 35, and there is no movable portion such as a hook. For that reason, the possibility of breakage of the lock mechanism 35 is extremely low. In other words, according to the present embodiment, a life of the lock mechanism 35 can be extended.

Further, in the electromagnetic lock type hook device 24, since the controller 40 can issue a command for ascending and descending the pantograph 3 and a command (a command for excitation and non-excitation) for opening and closing the hook at the hook portion 24a at the same time, there are also advantages that a response to locking and unlocking of the lock mechanism 35 is excellent and a complicated control is not required.

(Modification)

In the present embodiment, a proximity switch (posture detector) 31 can be provided for detecting whether the pantograph 3 is in a state of being completely descended and stored, or not (that is, a posture in which the framework 33 is folded) as shown in FIG. 6A and FIG. 6B. The proximity switch 31 is attached, for example, in the vicinity of the hook portion 24a of the hook device 24, and is configured to be turned on/off depending on a position at which the adsorption plate 27 of the fixing member 26 approaches or separates from each other. Then, when the proximity switch 31 detects the folding posture of the framework 33, the controller 40 excites the electromagnet 24a-1 built in the hook portion 24a under control. In this way, the electromagnet 24a-1 can be excited at the timing when the framework 33 is folded, so that foreign matter such as iron scraps can be prevented from adhering to the electromagnet 24a-1, and the engaged state of the fixing member 26 and the hook receiver 24b can be maintained excellently.

Incidentally, a sensor having a mechanical contact such as a limit switch or an optical sensor such as a photosensor can be employed instead of the proximity switch 31. The electric power used to excite the electromagnet 24a-1 may be supplied from a battery or the like, or may be supplied from a generator.

Figure 8:
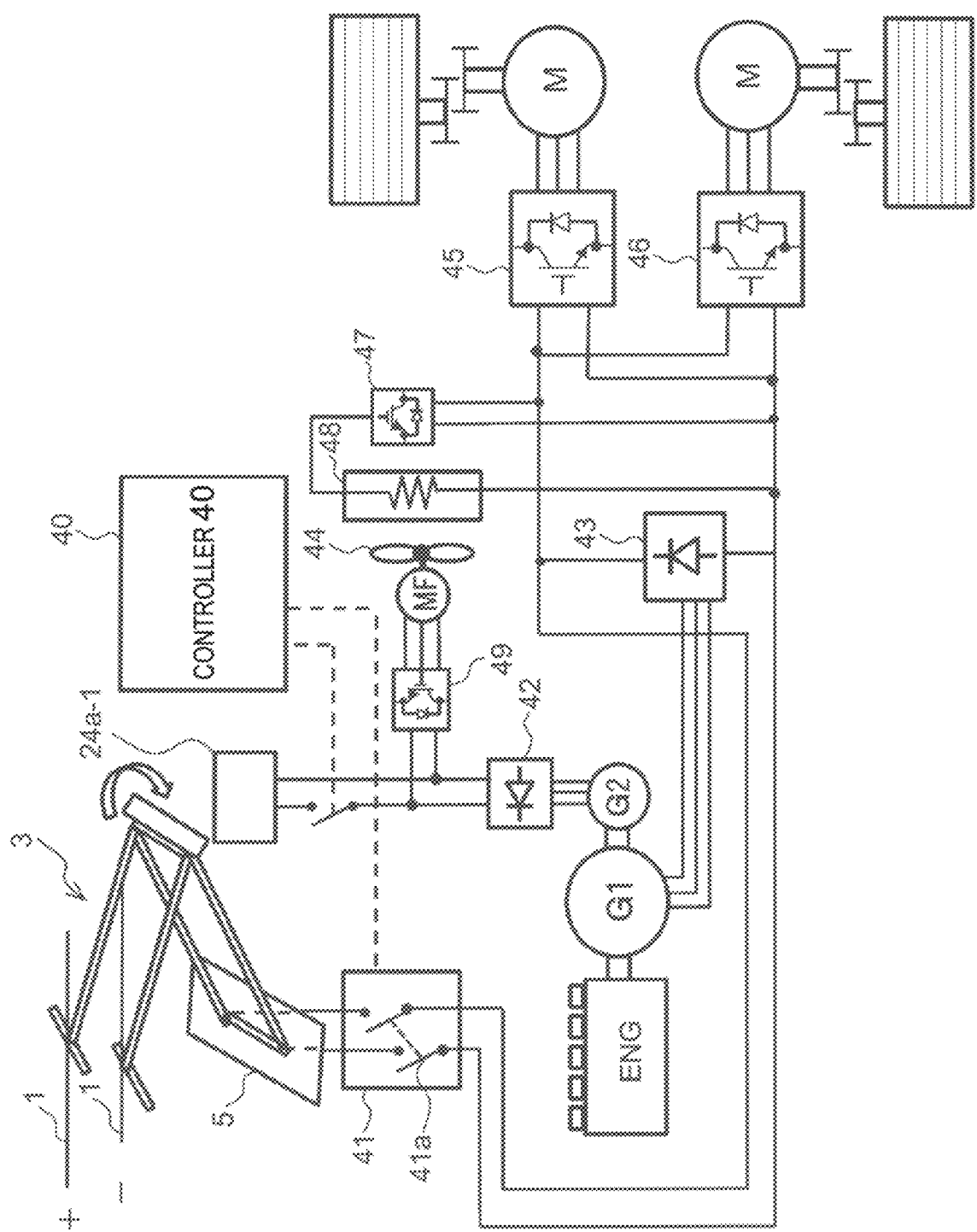
FIG. 8 is a schematic view showing a power supply circuit for supplying an electric power to an electromagnet provided in the hook device for fixing the pantograph shown in FIG. 3 with the inclusion of a peripheral configuration of the power supply circuit.

FIG. 8 is a schematic diagram showing a power supply circuit for supplying an electric power to the electromagnet 24a-1 provided in the hook device 24 for fixing the pantograph 3 described above, with the inclusion of a peripheral configuration of the power supply circuit. The power supply circuit includes, as a generator used for the AC driven dump truck 2, a main generator G1 for supplying an electric power to a drive motor M for driving wheels, and a sub-generator G2 for supplying an electric power to an auxiliary equipment (electrical components) such as a cooling fan 44 and the like. The main generator G1 driven by the diesel engine ENG generally generates and outputs three-phase AC power. The generated electric power is converted into a DC power by a rectifier 43. The DC power is converted into an AC power of variable frequency by the inverters 45 and 46 and supplied to the drive motor M. The drive motor M is driven by the inverters 45 and 46 to rotate the wheels through a reduction gear. A chopper 47 and a regeneration resistor 48 are connected between the rectifier 43 and the inverters 45 and 46.

Next, a power supply operation corresponding to mode switching in the power supply circuit will be described. The electric power from the overhead wire 1 in the AC driven dump truck 2 is supplied to the drive motor M (load device) in a two-wire manner, unlike a general train. The mode switch 41 includes a switch 41a that connects a received electric power from the overhead wire 1 to an internal circuit of the power supply circuit, and other control circuits. The mode switch 41 performs the switching operation based on a command of the controller 40, so that the power supply source is selected from the electric power from the overhead wire 1 (trolley power) and the electric power (generator power) from the main generator G1.

Although not shown, the controller 40 is configured by a CPU that performs various calculations, a storage device such as a ROM or an HDD that stores programs for executing calculations by the CPU, a RAM that serves as a work area when the CPU executes the programs, hardware including a communication interface which is an interface for transmitting and receiving data with respect to other devices, and software stored in the storage device and executed by the CPU.

Although the mode switching command to the controller 40 may be issued by the driver of the dump truck 2, the overhead wire 1 may be recognized by a camera or the controller 40 may make a determination based on position information. The inverters 45, 46 for the drive motor M can receive a power supply by either the trolley power or the generator power selected by the mode switch 41.

On the other hand, the sub-generator G2 supplies an electric power to the accessories including the electromagnet 24a-1 and the cooling fan 44. The electromagnet 24a-1 is supplied with a DC power through a rectifier 42. An AC power is supplied to a cooling fan motor MF that drives the cooling fan 44 through yet another inverter 49. The diesel engine ENG drives the sub-generator G2 set to an idling rotational speed by the controller 40 not only in the diesel mode but also in the trolley mode to drive to supply the electric power to the auxiliary devices regardless of the mode. Further, the controller 40 selects excitation or non-excitation of the electromagnet 24a-1 based on the power supply mode.

In this example, if switching of the power supply source for exciting the electromagnet 24a-1 is interlocked with the mode switching, the excitation can be made in the diesel mode and the non-excitation can be made in the trolley mode. As a result, an excitation state corresponding to a situation requiring the fixation of the pantograph 3 can be obtained in conjunction with switching of the mode. As a result, since the operation of excitation in the diesel mode and the operation of non-excitation in the trolley mode can be interlocked with the mode switching, it is not bothersome to individually operate the excitation operation of the electromagnet 24a-1.

The present invention is not limited to the embodiment described above, and various modifications can be made without departing from the technical spirit of the present invention, and all the technical matters included in the technical concept described in the claims are included in the subject of the present invention. The above-mentioned embodiment shows a preferable example, a person skilled in the art can realize various modifications from the disclosed contents, and those various modifications are included in the scope of the appended claims.

REFERENCE SIGNS LIST

1: overhead wire
2: dump truck
3: pantograph

6: collector shoe (current collecting portion)
12: underframe
14: lower frame
16: upper frame
23: cushioning material
24: hook device
24a: hook portion
24a-1: electromagnet
24b: hook receiver
24b-1: abutment surface
26: fixing member
27: adsorption plate
30: rubber plate (elastic material)
31: limit switch (posture detector)
33: framework
35: lock device
40: controller
41: mode switch
41a: switch
M: drive motor (load device)

The invention claimed is:

1. An electric drive vehicle comprising a current collecting device installed at an upper portion of a vehicle body and receiving an electric power from an overhead wire,
wherein the current collecting device includes:
a framework having an underframe, a lower frame that is pivotably linked to the underframe, and an upper frame that is pivotably linked to the lower frame;
a current collecting portion that is supported by the upper frame; and
a lock mechanism that holds the framework in a predetermined posture,
the framework is capable of moving up and down between a standing posture in which the current collecting portion is ascended and a folded posture in which the current collecting portion is descended, and
the lock mechanism includes an adsorption plate made of a magnetic material provided in the upper frame, and a hook device which is equipped with an electromagnet and adsorbs to hold the adsorption plate by a magnetic force to hold the framework in the folded posture as the predetermined posture.

2. The electric drive vehicle according to claim 1, further comprising a controller that controls excitation and non-excitation of the electromagnet,
wherein the controller de-excites the electromagnet in conjunction with an ascending movement of the framework.

3. The electric drive vehicle according to claim 2, further comprising a posture detector that detects whether or not the framework is in the folded posture,
wherein the controller excites the electromagnet when the posture detector detects that the framework is in the folded postured.

4. The electric drive vehicle according to claim 1, further comprising: a prime mover; a generator driven by the prime mover; a power supply circuit that uses a generator power obtained by the generator, and a trolley power obtained by power received from the overhead wire as a drive power for a load device; and a controller that controls excitation and non-excitation of the electromagnet,
wherein the controller controls opening and closing of a switch provided in the power supply circuit, switches a power feeding mode to the load device from a diesel mode for feeding the generator power or a trolley mode for feeding the trolley power, and excites the electromagnet when the feeding mode is the diesel mode.

5. The electric drive vehicle according to claim 1,
wherein a fixing member for attaching the adsorption plate is provided at a leading end of the upper frame,
the hook device has a hook receiver that is abutted against the fixing member, and
the fixing member and the hook receiver are formed to be engaged with each other in a recession and projection fitting manner and regulate motion in a horizontal direction.

6. The electric drive vehicle according to claim 5, wherein an elastic material is provided on an abutment surface of the hook receiver against the fixing member.

7. The electric drive vehicle according to claim 5, wherein the underframe is provided with a cushioning material for cushioning an impact caused by an abutment with a local portion of the framework when the framework is folded.

* * * * *